United States Patent
Hager et al.

(10) Patent No.: US 11,952,978 B2
(45) Date of Patent: Apr. 9, 2024

(54) WIND TURBINE TRANSMISSION

(71) Applicant: Miba Gleitlager Austria GmbH, Laakirchen (AT)

(72) Inventors: Gunther Hager, Ottsdorf (AT); Johannes Sebastian Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 645 days.

(21) Appl. No.: 16/611,605

(22) PCT Filed: May 23, 2018

(86) PCT No.: PCT/AT2018/060104
§ 371 (c)(1),
(2) Date: Nov. 7, 2019

(87) PCT Pub. No.: WO2018/213861
PCT Pub. Date: Nov. 29, 2018

(65) Prior Publication Data
US 2020/0158090 A1    May 21, 2020

(30) Foreign Application Priority Data
May 23, 2017   (AT) .......................... GM 50097/2017

(51) Int. Cl.
*C23C 4/067*    (2016.01)
*C23C 4/129*    (2016.01)
(Continued)

(52) U.S. Cl.
CPC .............. *F03D 15/00* (2016.05); *C23C 4/067* (2016.01); *C23C 4/129* (2016.01); *F03D 80/70* (2016.05);
(Continued)

(58) Field of Classification Search
CPC .............. F16C 2223/42; F16C 2360/31; F16C 2361/61; F16H 57/0018; F16H 57/02;
(Continued)

(56) References Cited

U.S. PATENT DOCUMENTS 3,941,903 A * 3/1976 Tucker, Jr. .............. F16C 33/14
                                                              427/451
4,756,212 A    7/1988 Fuehrer
(Continued)

FOREIGN PATENT DOCUMENTS

AT         509 624 A1   10/2011
AT         509624    *   4/2012
(Continued)

OTHER PUBLICATIONS

Translation of JP2007270206 obtained Apr. 13, 2023.*
(Continued)

*Primary Examiner* — James Pilkington
(74) *Attorney, Agent, or Firm* — Collard & Roe, P.C.

(57) ABSTRACT

A wind turbine gearbox, in particular a planetary gearbox, has at least one gear mounted on an axle, for which purpose a sliding layer is arranged between the gear and the axle, the sliding layer being sprayed directly onto the axle or, with intermediate arrangement of at least one further layer, onto the further layer using a thermal spaying method.

7 Claims, 4 Drawing Sheets

(51) Int. Cl.
F03D 15/00 (2016.01)
F03D 80/70 (2016.01)
F16C 17/02 (2006.01)
F16H 57/08 (2006.01)

(52) U.S. Cl.
CPC .......... *F16C 17/02* (2013.01); *F16C 2223/42* (2013.01); *F16C 2360/31* (2013.01); *F16C 2361/61* (2013.01); *F16H 57/082* (2013.01)

(58) Field of Classification Search
CPC .. F16H 57/031; F16H 57/041; F16H 57/0479; F16H 57/082; F16H 2057/085; F16H 2057/02091; F16H 2057/02095; F16H 2057/021
See application file for complete search history.

(56) References Cited

U.S. PATENT DOCUMENTS

| | | | |
|---|---|---|---|
| 7,344,312 B2* | 3/2008 | Betsch | C23C 4/18 29/898.059 |
| 7,879,453 B2 | 2/2011 | Lang et al. | |
| 7,887,922 B2* | 2/2011 | Mayston | F16C 33/201 524/439 |
| 7,964,239 B2* | 6/2011 | Miyamoto | C23C 4/129 384/907 |
| 8,234,785 B2* | 8/2012 | Guerreiro | B23P 15/00 29/888.09 |
| 8,591,371 B2 | 11/2013 | Dinter et al. | |
| 8,790,213 B1 | 7/2014 | Isayama et al. | |
| 8,840,521 B2 | 9/2014 | Kari et al. | |
| 9,416,867 B2* | 8/2016 | Van Den Donker | F16C 17/105 |
| 9,419,495 B2 | 8/2016 | Kari | |
| 2011/0206517 A1 | 8/2011 | Antonov et al. | |

FOREIGN PATENT DOCUMENTS

| | | |
|---|---|---|
| AT | 512 436 B1 | 10/2013 |
| AT | 14431 U1 | 11/2015 |
| CN | 101581284 A | 11/2009 |
| CN | 102834630 A | 12/2012 |
| CN | 105624601 A | 6/2016 |
| DE | 4142454 A1 | 7/1992 |
| DE | 102 60 132 A1 | 7/2004 |
| EP | 1 544 504 A2 | 6/2005 |
| EP | 1717469 * | 11/2006 |
| EP | 2 383 480 A1 | 11/2011 |
| EP | 3 020 965 A1 | 5/2016 |
| GB | 2251661 A | 7/1992 |
| JP | S56109914 A | 8/1981 |
| JP | S59-48861 B2 | 11/1984 |
| JP | 2007270206 * | 10/2007 |
| JP | 5622716 B2 | 11/2014 |
| WO | 2005/033353 A2 | 4/2005 |
| WO | 2013/106879 A1 | 7/2013 |
| WO | 2013106878 A1 | 7/2013 |

OTHER PUBLICATIONS

Translation of EP1717469 obtained Sep. 26, 2023.*
Chinese Search Report in CN 2018800338423, dated Jun. 15, 2020.
Chinese Office Action in 2018800338423, dated Jun. 23, 2020.
Chinese Office Action in 2018800338423, dated Feb. 2, 2021.
The Science and Technology of Thermal Spray Coatings, Metallurgical Industry Press, 2013, 17 pages.
Science & Technology Information, No. 5, 2011, 1 page.
International Search Report in PCT/AT2018/060104, dated Sep. 17, 2018.
The Science and Technology of Thermal Spray Coatings, Metallurgical Industry Press, 2013, with English Summary, 19 pages.
Science & Technology Information, No. 5, 2011, Technical Application of Thermal Spraying Technology in the Manufacturing of Sliding Bearings, 5 pages, with English machine translation.
"Physical Vapor Deposition," Wikipedia, https://en.wikipedia.org/wiki/Physical_Vapor_Deposition, accessed Mar. 18, 2023.
"Thermal Spraying," Wikipedia, https://en.wikipedia.org/wiki/Thermal_Spraying, accessed Mar. 18, 2023.
Joerg Hosemann, "Laser-assisted coating technology for sustainable plain bearings as an efficient replacement for the centrifugal casting process to reduce the heavy metal content in bearing bronzes, Final Report," Project LAGER, ADMOS Plain Bearings Ltd., Berlin, Germany, Jun. 12, 2017 (D7).
"Coating," Wikipedia, https://de.wikipedia.org/wiki/Beschichten, as last edited of Dec. 18, 2017 (D8).
Joerg Hosemann to Dr. Ralf Dinter, e-mail providing further information on LAS process, sent May 4, 2017 (D10).
Admos Plain Bearings Ltd., "Laserauftragschweissen experience and results," general presentation by ADMOS Gleitlager GmbH, May 4, 2017 (D11).
"Bild_Planetenbolzen," figure (D12) attachment to Joerg Hosemann to Dr. Ralf Dinter, e-mail providing further information on LAS process, sent May 4, 2017 (D10), published May 4, 2017.
Walter Gnilke, "Guided Planets, Possibilities and limitations in comparison with roller bearings," ADMOS Technical Manual, ADMOS Gleitlager GmbH, Berlin, Germany, published Feb. 14, 2005 (D14).
Thomas Schopphoven, Andres Gasser, Gerhard Backes, "EHLA: Extreme High-Speed Laser Material Deposition, Economical and effective protection against corrosion and wear," Lasertechnik Journal, vol. 14, Issue 4, pp. 26-29, first published Jun. 16, 2017 (D15).

* cited by examiner

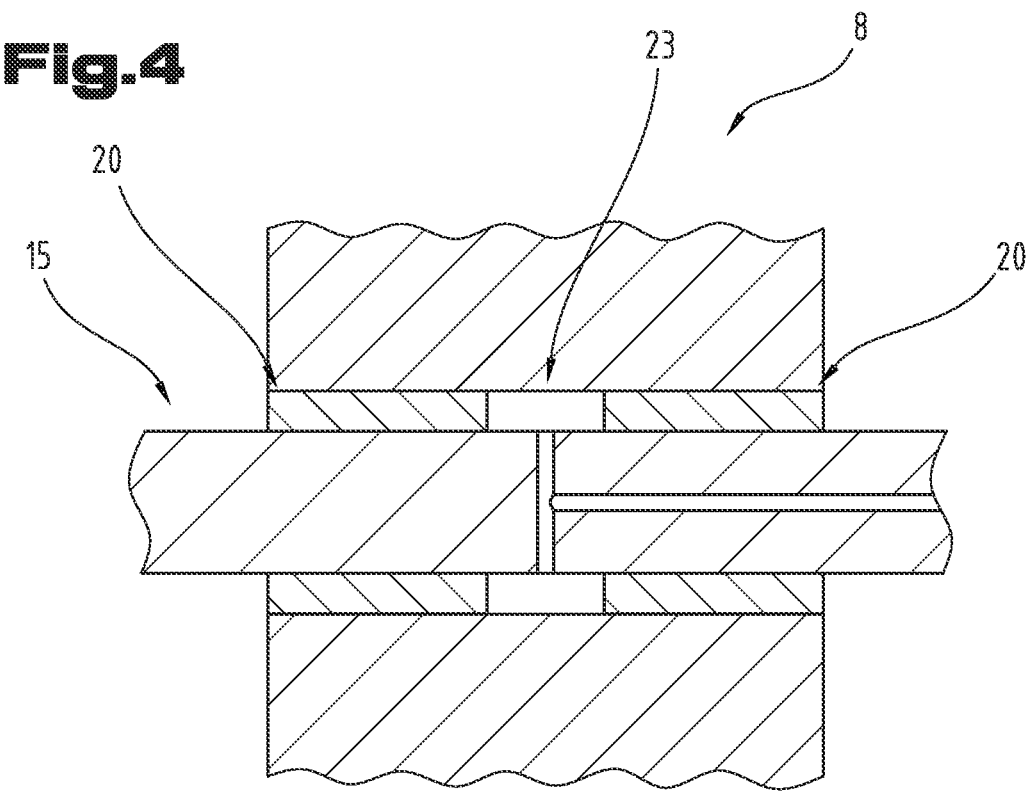

WIND TURBINE TRANSMISSION

CROSS REFERENCE TO RELATED APPLICATIONS

This application is the National Stage of PCT/AT2018/060104 filed on May 23, 2018, which claims priority under 35 U.S.C. § 119 of Austrian Application No. GM 50097/2017 filed on May 23, 2017, the disclosure of which is incorporated by reference. The international application under PCT article 21(2) was not published in English.

BACKGROUND OF THE INVENTION

1. Field of the Invention

The invention relates to a wind turbine gearbox, in particular a planetary gearbox, having at least one gear which is mounted on an axle for which purpose a sliding layer is arranged between the gear and the axle.

The invention further relates to a wind turbine with a rotor and a generator, wherein a wind turbine gearbox, in particular a planetary gearbox, which is operatively connected to the rotor and the generator, is arranged between the rotor and the generator.

Moreover, the invention relates to a method for manufacturing an axle for a wind turbine gearbox, in particular for a planetary gearbox.

2. Description of the Related Art

Planetary gearboxes for wind turbines for generating electric current, as are known for example from DE 102 60 132 A1, are used for converting the relatively low rotational frequency of the rotor of the wind turbine into a higher rotational frequency of the generator rotor. Most commonly, rolling bearings are used as bearing elements for the planetary gears in such planetary gearboxes, as is also described in DE 102 60 132 A1. However, the prior art also describes sliding bearings as bearing elements, for example in EP 1 544 504 A2 or in AT 509 624 A1. In this respect, sliding bearing bushes which are shrunk onto the axle or pressed into the planetary gear are most commonly used. The replacement of such sliding bearings in the event of maintenance or wear is complex and thus cost-intensive.

SUMMARY OF THE INVENTION

It was the object of the invention to provide an easy to maintain sliding bearing solution for a wind turbine gearbox.

The object is achieved by means of the initially mentioned wind turbine gearbox in which the sliding layer is sprayed directly onto the axle or, with intermediate arrangement of at least one further layer, onto the intermediate layer by means of a thermal spaying method.

The object is further achieved by means of the initially mentioned wind turbine in which the wind turbine gearbox is provided in accordance with the invention.

Moreover, the object of the invention is achieved by means of the initially mentioned method comprising the steps of providing the axle and spraying a sliding layer of a spraying material directly onto the axle or, after application of at least one metallic intermediate layer, onto the intermediate layer by means of a thermal spaying method.

The advantage of this is that based on the sprayed on sliding layer, maintenance of the sliding bearing can be facilitated in so far as hence the sliding bearing becomes accessible by a structure of the axle that can be realized relatively easily. This can even be carried out on the tower of the wind turbine, which can save time and thus costs. Moreover, the sprayed on sliding layer—as compared to sliding bearing bushes—has the advantage that losses of position of the sliding bearings due to creep effects or relaxation effects can be precluded. The thermal spraying of the sliding layer has the advantage that the axle itself is not or only marginally thermally loaded during the coating process. Furthermore, the particles flatten when they hit the axle such that they can be oriented in the direction of the rotational movement of the gear whereby coating components can better develop their lubricating effect through a longer running distance in the circumferential direction.

According to an embodiment variant of the wind turbine gearbox, it can be provided for that the sliding layer consists of or comprises a material selected from a group comprising aluminum base alloys, bismuth base alloys, silver base alloys, copper base alloys. These wear-resistant and tribologically particularly effective materials proved to be particularly advantageous in compact wind turbine gearboxes with a high power density and without the use of load balancing technologies, such as the so-called "flexible pin solution". Moreover, these alloys can be relatively easily processed by means of thermal spaying methods.

It is further possible that a polymer-based running-in layer is arranged on the sliding layer so as to achieve a better adaptability of the sliding bearing running surface to the counter running surface during running in of the sliding layer, it being of additional advantage that this running-in layer also improved the tribology of the sliding bearing per se. In this regard, it is advantageous that the polymer-based running-in layer can be applied by means of a spraying method, i.e. by means of a method showing a certain similarity to thermal spaying methods. Hence, the production of the coated axle can be facilitated.

According to another embodiment variant of the wind turbine gearbox, it can be provided for that two sliding layers arranged at an axial distance from one another are sprayed onto the axle by means of a thermal spaying method. By the distance of the two sliding layers, between these, an intermediate space is formed which can be used for oil supply via the axle whereby improved oiling of the sliding layers can be achieved. In this regard, it is advantageous that this intermediate space can be produced by means of the thermal spaying method easily and without mechanical processing.

Hard particles and/or soft phase particles can be embedded in the sliding layer. In this regard, it is again advantageous that these particles can be easily processed with the thermal spraying process such that their mixing into the sliding layer does not represent a problem, as can for example be the case as a consequence of segregations in melting metallurgy. The advantage of this is that the particles can also be used to easily adjust the graininess of the structure of the sliding layer. Hence, a coarse-grained structure formation can easily be adjusted, whereby diffusion processes along the grain boundaries and thus also failure mechanisms related therewith, such as grain boundary creeping or the decrease in the content of an alloying element, can be reduced which allows for longer operation of the sliding bearing.

The hard particles are preferably selected from a group comprising metal oxides, metal nitrides, metal carbides, metal borides, metal silicides. Thus, preferably no ceramic hard particles having a relatively high melting point are used. Hence, coarsening of the hard particles in consequence of diffusion phenomena can be better prevented whereby the adjustability of certain desired tribological characteristics of the sliding layer can be improved by means of the thermal spaying method.

The soft phase particles can be selected from a group comprising graphite, hexagonal BN, metal sulphides such as $MoS_2$, $WS_2$ and the like. The advantage of this is that in particular BN is inert and does not oxidize when sprayed on. Graphite does partially burn during the application; however, the oxides are not integrated into the layer but evaporate in gaseous form. Sulphides can also significantly improve the self-lubricating properties of the sliding layer.

According to an embodiment variant of the method, it can be provided for that the hard particles and/or soft particles are kept in the solid form during spraying on. Thus, these particles do not melt during spraying on of the sliding layer, whereby the risk of an unintended phase transition during spraying can be reduced. Moreover, hence, a change of the grain size of these particles can better be prevented. Thereby, in turn, the afore-mentioned structure grain size of the alloy of the sliding layer can be adjusted more precisely.

The thermal spaying method can preferably be selected from a group consisting of flame spraying, plasma spraying, cold spraying, laser spraying, as these methods are relatively easy to carry out.

BRIEF DESCRIPTION OF THE DRAWINGS

For the purpose of better understanding of the invention, it will be elucidated in more detail by means of the figures below.

These show in a respectively very simplified schematic representation:

FIG. 4 a cutout from an embodiment variant of a wind turbine gearbox in a sectional side view.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
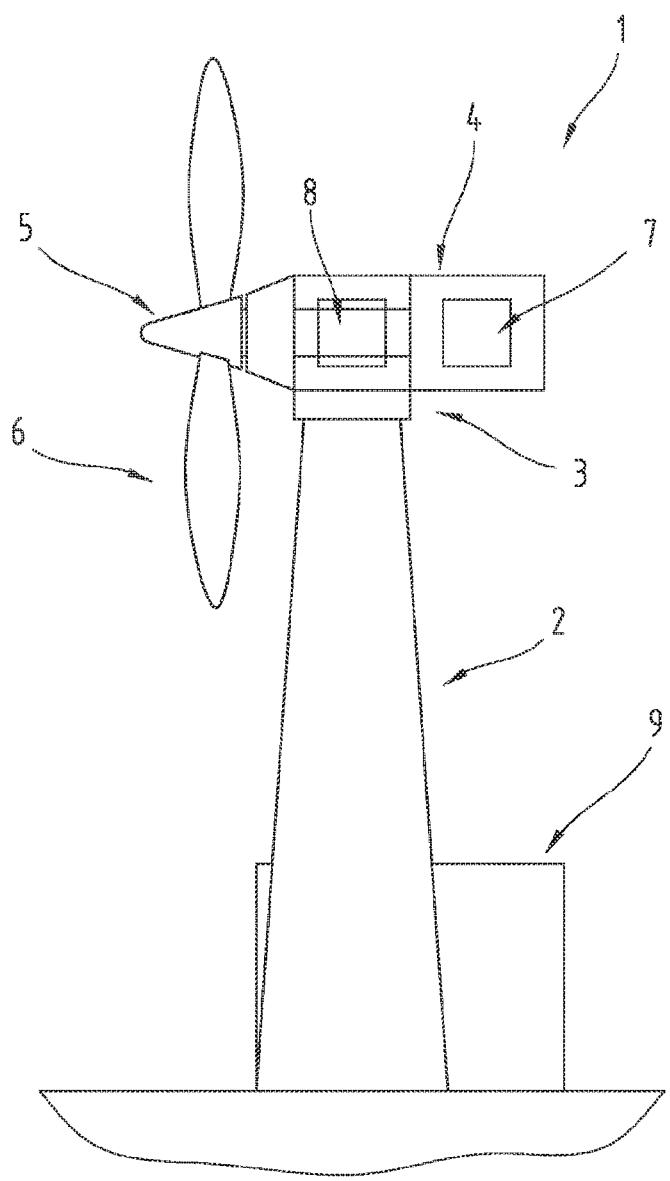
FIG. 1 a side view of a wind turbine.

FIG. 1 shows a wind turbine 1. This wind turbine 1 in general corresponds to the prior art, meaning that it comprises a tower 2 on which—with intermediate arrangement of a wind direction follow-up device 3—a nacelle 4 is arranged on the front end of which a rotor 5 with rotor blades 6 and on the back end of which a generator 7 are arranged. A wind turbine gearbox 8, which is connected on the one hand to the rotor 5 and on the other hand to the moving member of the generator 7, is arranged between the rotor 5 and the generator 7, i.e. a not further represented moving member of the generator. The wind turbine gearbox 8 serves for increasing the rotational frequency of the moving member as compared to the rotor 5. On the lower part of the tower 2, lastly, there is a network connection 9.

As these components are in general known from the prior art for wind turbines 1, reference is here made to relevant literature in this regard. However, it should be mentioned that the wind turbine 1 is not obligatorily limited to the type represented in FIG. 1.

Figure 2:
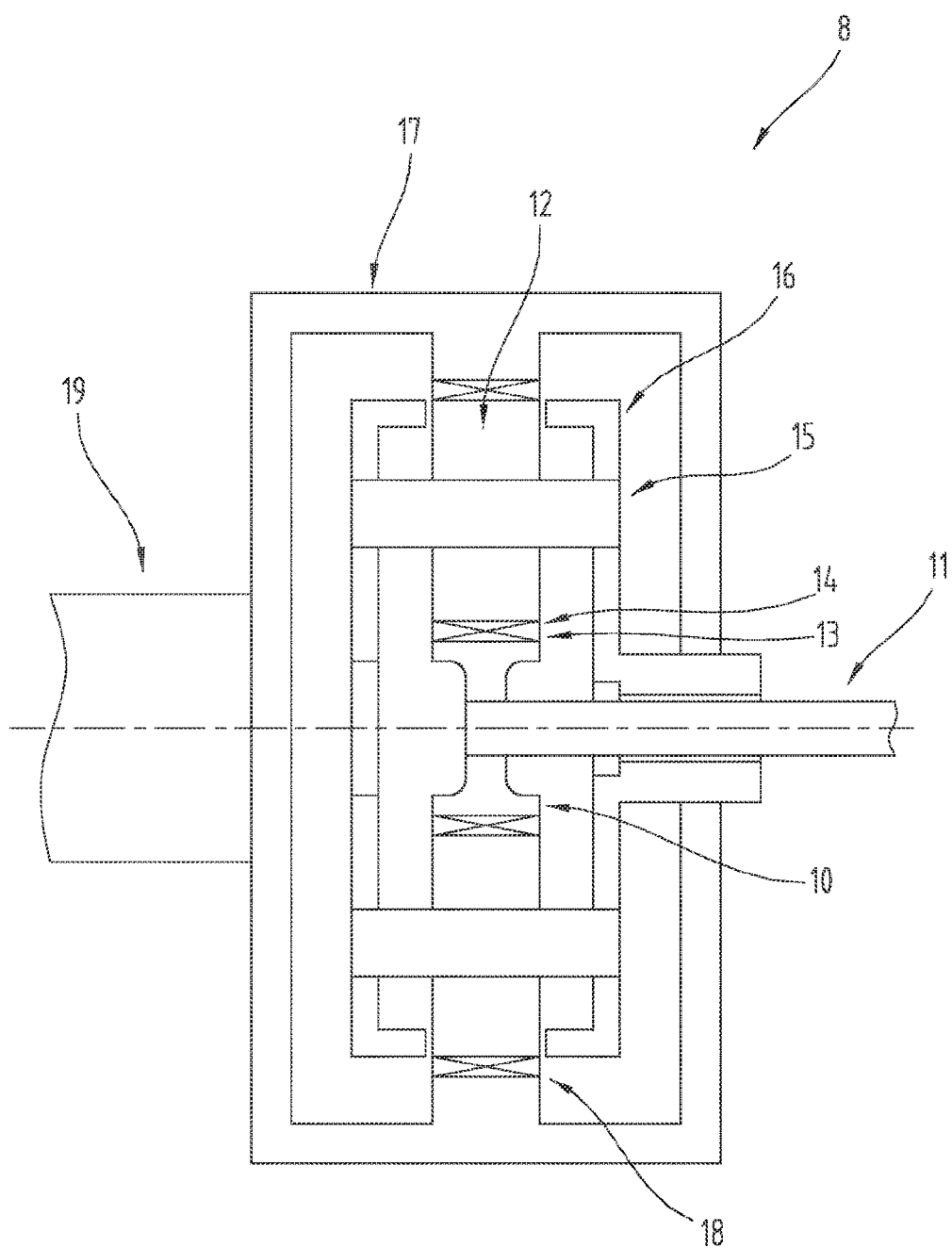
FIG. 2 a sectional side view of a wind turbine gearbox in the form of a planetary gearbox.

FIG. 2 shows the wind turbine gearbox 8 in the form of a simple planetary gearbox in a sectional side view.

The wind turbine gearbox 8 comprises a sun gear 10 connected to a shaft 11 so as to be prevented from rotating relative to it, said shaft 11 leading to the generator rotor. The sun gear 10 is surrounded by several gears 12 in the form of planetary gears, for example two, preferably three or four. The sun gear 10 and the gears 12 comprise end toothings 13, 14 that are engaged in meshing arrangement, these end toothings 13, 14 being adumbrated by a cross in FIG. 1. The gears 12 are mounted on an axle 15 (planetary gear bolt). The axles 15 are inserted into bores of an axle carrier 16 (planetary carrier). An internal gear 17 is arranged above the gears 12, said internal gear 17 also at least partially comprising a toothing 18, which is in engaged in meshing arrangement with the end toothing 14 of the gears 12, on an inner surface. The internal gear 17 is connected to a rotor shaft 19 of the rotor 5 of the wind turbine 1 (FIG. 1) so as to be prevented from rotating relative to it. The end toothings 13, 14 and/or the toothing 18 can be designed as spur toothing or helical toothing.

As such planetary gearboxes are in general also already known from the prior art, further explanations are superfluous here. However, reference is made to the fact that not only single-stage designs of planetary gearboxes are possible but also multi-stage designs, such as two-stage or three-stage designs.

Reference is made to the fact that below, the singular will be used as regards the gear 12. However, it is clear that the invention is applicable to all gears 12 of such a wind turbine gearbox 8.

Figure 3A:
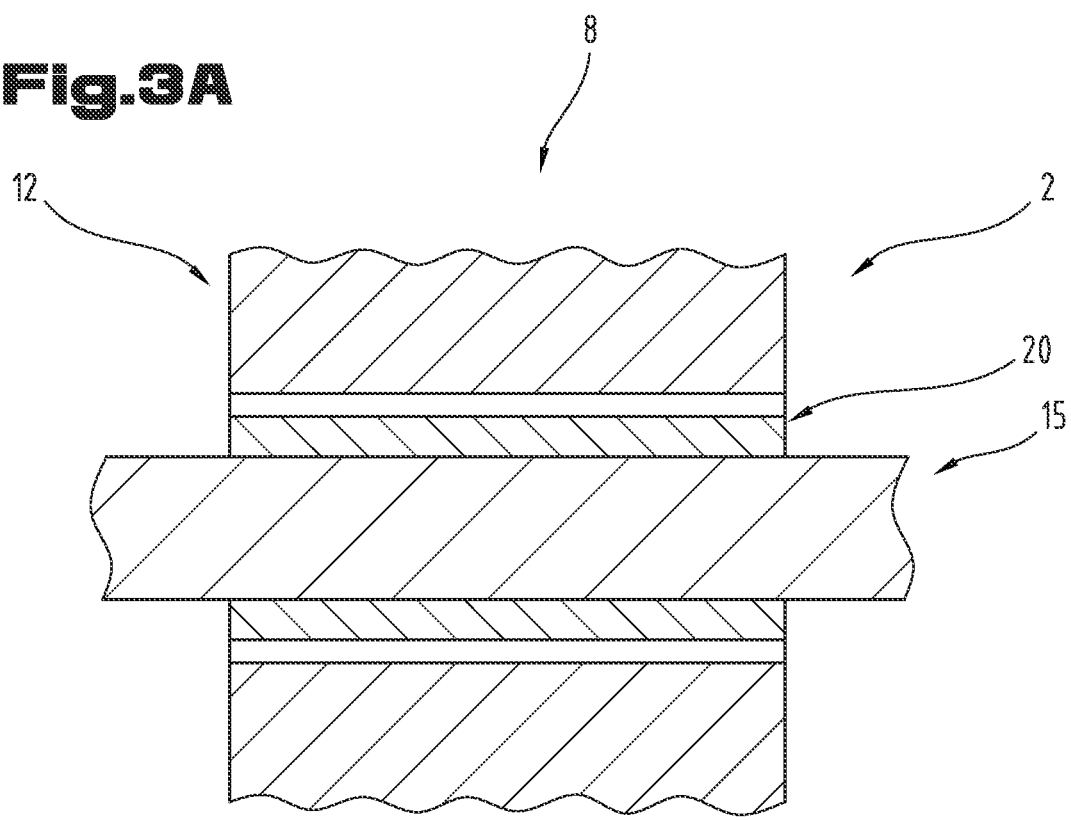
FIGS. 3A and 3B a cutout from the wind turbine gearbox in a sectional side view.

FIG. 3A shows a cutout from the wind turbine gearbox 8 in a sectional side view applied in the region of the bearing of the gear 12 on the axle 15. The gear 12 is mounted on the axle via a sliding bearing. For this purpose, a sliding layer 20 is arranged between the axle 15 and the gear 12. The sliding layer 20 is arranged directly on the axle 15 and connected thereto. For this purpose, the material for the sliding layer 20 is applied onto the axle 15 by means of a thermal spaying method.

Figure 3B:
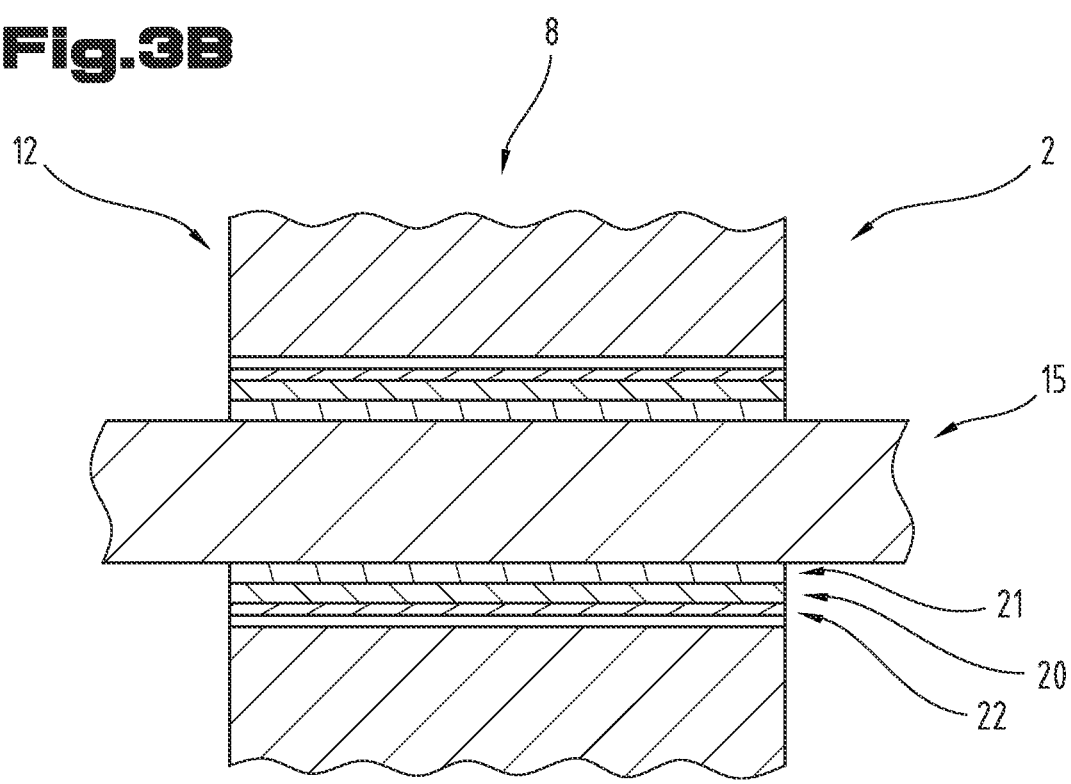

According to a corresponding embodiment variant, if required it can be provided for that prior to the application of the sliding layer 20 onto the axle 15, at least one further layer 21 is applied, as is shown in FIG. 3B. Preferably, the further layer 21 is also applied onto the axle 15 by means of a thermal spaying method. The further layer 21 can for example be a diffusion barrier layer and/or a bonding layer and/or a bearing metal layer. The sliding layer 20 is applied directly onto the further layer 21 in this embodiment variant.

The sliding layer 20 is a metal layer, in particular consisting of or comprising a metal alloy. The material can preferably be selected from a group comprising aluminum base alloys, bismuth base alloys, silver base alloys, copper base alloys. However, other alloys, such as indium-based alloys, lead-based alloys and/or CuPb-based alloys with a high lead content can also be used. However, preferably lead-free alloys are used. Lead-free alloys are alloys which contain lead in a maximum proportion corresponding to the proportion of usual impurities in such alloys.

The further layer 21 can for example be an aluminum base alloy, a tin base alloy, a copper base alloy, a CuPb base alloy, an AlSn base alloy, an alloy on an AlZn—, AlSi, AlSnSi, CuAl, CuSn, CuZn, CuSnZn, CuZnSn, CuBi as well as AlBi base, a pure metal alloy of Al, Ni, Co, Sn, etc., with the proviso that the composition of the further layer 21 is different from that of the sliding layer 20.

According to another embodiment variant, it can be provided for that a running-in layer 22 is arranged on the sliding layer 20, said running-in layer 22 in this case forming the radially outer layer and being brought into sliding contact with the gear 12. The running-in layer 22 can for example be a pure metal layer, such as tin. However, preferably the running-in layer 22 is a polymer-based running-in layer 22. In particular, a polyimide or a polyamidimide is used as polymer. Moreover, the running-in layer can also contain a proportion of solid lubricant particles, for example $MoS_2$ and/or graphite. The proportion of the polymer in the running-in layer 22 can amount to between 40 wt. % and 80 wt. %. The balance adding up to 100 wt. % is constituted by the solid lubricant particles.

It is further possible that hard particles and/or soft phase particles are embedded in the sliding layer 20. The hard particles can be selected from a group comprising metal oxides such as MgO, $TiO_2$, $ZrO_2$, $Al_2O_3$, metal nitrides, metal carbides such as SiC, WC, $B_4C$, metal borides, metal silicides. The soft phase particles can be selected from a group comprising graphite, hexagonal BN, metal sulphides.

It should be mentioned that the hard particles have a higher hardness than the matrix of the sliding layer 20 in which they are embedded. The soft phase particles, in contrast, have a lower hardness than the matrix of the sliding layer 20 in which they are embedded.

The proportion of the hard particles and/or soft phase particles in the sliding layer 20 can be selected from a range between 3 wt. % to 25 wt. %, in particular of 5 wt. % to 20 wt. %.

According to another embodiment variant, the mean particle size of the soft phase particles and/or hard phase particles can amount to between 1 μm and 100 μm, preferably between 5 μm and 20 μm.

FIG. 4 shows a cutout of another embodiment variant of the wind turbine gearbox 8 in longitudinal section. As opposed to the above embodiment variant of the wind turbine gearbox 8, in this embodiment variant two sliding layers 20 arranged at an axial distance from one another are sprayed onto the axle 15 by means of a thermal spaying method. Due to the axial distance of the two sliding layers 20, an intermediate space 23 is formed between these. Said space can be used for feeding a lubricant. In this respect, the lubricant feed can be carried out (solely) via the axle 15 as is adumbrated in dashed lines.

For better distribution of the lubricant across at least approximately the entire running surfaces, the intermediate space 7 can be connected to the ambient atmosphere via at least one connecting line. Preferably, the connecting line extends within the axle 15.

It should be mentioned that instead of two sliding layers 20, more than two sliding layers 20 could be sprayed onto the axle 15.

As was already mentioned, the sliding layer 20 is sprayed onto the axle 15 by means of a thermal spaying method. Preferably, a spraying method selected from a group of flame spraying, for example wire flame spraying or high velocity flame spraying, e.g. HVOF (high velocity oxygen fuel) or HVAF (high velocity air fuel), plasma spraying, cold spraying, laser spraying is used.

According to an embodiment variant in this regard, it can be provided for that a spraying material in which hard particles and/or soft phase particles are contained is used, wherein the hard particles and the soft phase particles are kept in the solid form during spraying on. For this purpose, a metal alloy having a low melting point is selected as the hard particles and/or soft phase particles.

Prior to spraying the sliding layer 20 or the further layer 21 onto the axle 15, which is in particular constituted of a steel, the axle is preferably pretreated. This pretreatment preferably comprises roughening of the surface of the axle 15 at least in the region in which the sliding layer 20 or the further layer 21 is applied. In particular, the axle 15 is blasted in this region.

Then, the axle 15 is preferably cleaned.

The spraying material can be used in a wire or powder form.

Spraying on the sliding layer 20 and/or the further layer 21 can also be carried out in a vacuum or a protective gas atmosphere.

After spraying on, the sliding layer 20 and/or the further layer 21 can be subjected to after-treatment.

The exemplary embodiments show possible embodiment variants, while it should be noted at this point that combinations of the individual embodiment variants are also possible.

Finally, as a matter of form, it should be noted that for ease of understanding of the wind turbine gearbox 8 and/or the wind turbine 1, these are not obligatorily depicted to scale.

LIST OF REFERENCE NUMBERS 1 wind turbine
2 tower
3 wind direction follow-up device
4 nacelle
5 rotor
6 rotor blades
7 generator
8 wind turbine gearbox
9 network connection
10 sun gear
11 shaft
12 gear
13 end toothing
14 end toothing
15 axle
16 planetary carrier
17 internal gear
18 toothing
19 rotor shaft
20 sliding layer
21 layer
22 running-in layer
23 intermediate space

The invention claimed is:

1. A wind turbine gearbox comprising at least one gear mounted on an axle, for which purpose a sliding layer is arranged between the gear and the axle;
wherein the sliding layer is either sprayed directly onto the axle or is sprayed onto a further layer that is provided on the axle, the further layer forming an intermediate layer between the axle and the sliding layer, by means of a thermal spray method; and wherein the sliding layer comprises flattened particles in solid form embedded in the sliding layer and having a length oriented in a direction of rotational movement of the at least one gear.

2. The wind turbine gearbox according to claim 1, wherein the sliding layer comprises a material selected from a group comprising consisting of aluminum base alloys, bismuth base alloys, silver base alloys, and copper base alloys.

3. The wind turbine gearbox according to claim 1, wherein a polymer-based running-in layer is arranged on the sliding layer.

4. The wind turbine gearbox according to claim 1, wherein two sliding layers arranged at an axial distance from one another are sprayed onto the axle by means of a thermal spraying method.

5. The wind turbine gearbox according to claim 1, wherein the particles comprise hard particles and/or soft phase particles embedded in the sliding layer.

6. The wind turbine gearbox according to claim 5, wherein the hard particles are selected from a group consisting of metal oxides, metal nitrides, metal carbides, metal borides, and metal silicides and/or wherein the soft phase particles are selected from a group consisting of graphite, hexagonal BN, and metal sulfides.

7. A wind turbine comprising a rotor and a generator, wherein a wind turbine gearbox, which is operatively connected to the rotor and the generator is arranged between the rotor and the generator, wherein the wind turbine gearbox is designed according to claim 1.

\* \* \* \* \*